United States Patent
Kumada et al.

[15] 3,670,211
[45] June 13, 1972

[54] SWITCHING CONDENSER ELEMENT FOR SWITCHING AN ALTERNATING CURRENT

[72] Inventors: Akio Kumada, Kodaira; Kenkichi Suzuki, Hachioji; Kenichi Kitta, Yokohama, all of Japan

[73] Assignee: Hitachi, Ltd., Tokyo, Japan

[22] Filed: Aug. 21, 1970

[21] Appl. No.: 65,995

[30] Foreign Application Priority Data

Aug. 29, 1969 Japan..................................44/68843

[52] U.S. Cl..............................317/230, 317/231, 317/258
[51] Int. Cl. ..........................................................H01g 9/00
[58] Field of Search....................................317/238, 258, 231

[56] References Cited

UNITED STATES PATENTS

| | | |
|---|---|---|
| 3,279,947 | 10/1966 | Kaiser...............................317/258 X |
| 3,305,394 | 2/1967 | Kaiser et al. ......................317/258 X |
| 3,377,524 | 4/1968 | Bock et al............................317/234 |
| 3,553,134 | 1/1971 | Ikushima et al....................317/238 X |
| 3,569,802 | 3/1971 | Brauer et al..........................317/231 |

Primary Examiner—James D. Kallam
Attorney—Craig, Antonelli & Hill

[57] ABSTRACT

A condenser using a dielectric material of $Pb(Zr-Ti)O_3$ system is used as a starting condenser for a single phase induction motor, so that the ferroelectric material is heated by an alternating current flowing through the condenser to a temperature near the Curie-point thereof and that the impedance of the condenser changes considerably.

9 Claims, 4 Drawing Figures

PATENTED JUN 13 1972 3,670,211

INVENTORS
AKIO KUMADA
KENKICHI SUZUKI
KENICHI KITTA

BY Craig, Antonelli, Stewart & Hill
ATTORNEYS

SWITCHING CONDENSER ELEMENT FOR SWITCHING AN ALTERNATING CURRENT

BACKGROUND OF THE INVENTION

1. FIELD OF THE INVENTION

This invention relates to a condenser for alternating current control, more particularly to a condenser using a material of Pb(Zr-Ti)O$_3$ system as the principal ferro-electric substance or to a starting condenser for a single phase induction motor.

2. DESCRIPTION OF THE PRIOR ART

As is well known in the art, a starting condenser for a single phase induction motor is used in order to produce a current which imparts the starting torque to the motor, but it is dispensable during the stationary operation time of the motor. Therefore, conventionally the condenser is disconnected by means of, for example, a mechanical switch after it has once been started. However, such conventional method has drawbacks in that the contacts of the switch are apt to quickly wear away because of the considerably high frequency of operating the switch. Further, troubles are often caused by, for example, sputtering of the material of the contacts, thus making the life of the switch short. Though an electronic switching element may be used in place of such mechanical switch, such electronic switching elements are generally expensive and are not suitable for commercial motors.

SUMMARY OF THE INVENTION

One object of this invention is to provide a novel condenser for alternating current control of which the impedance drastically changes as a result of self-heating due to an alternating current supplied to it.

Another object of this invention is to provide a condenser for alternating current control which is best suited for a starting condenser for a single phase induction motor.

A further object of this invention is to dispense with the switch for disconnecting the starting condenser of a single phase induction motor by using a condenser of which the principal ferro-electric material is a material of the Pb(Zr-Ti)O$_3$ system (a solid solution of PbZrO$_3$ and PbTiO$_3$).

According to this invention, to achieve the above objects, there is used for the dielectric material of the above described condenser a material of Pb(Zr-Ti)O$_3$ system, or a ferro-electric material obtained by the substitution of a part of Pb in said system by divalent elements, for example, rare earth elements such as Sr, Mg, Ca, Cd and Y, or alternatively a dielectric material obtained by the substitution of a part of or all of Zr or Ti in said system by such elements as Sn, Nb, Ta, P, As, Sb, Bi, Cr, W, Fe, Co and Ni, or further a dielectric material of which the principal ingredient is PbZrO$_3$.

DESCRIPTION OF THE PREFERRED EMBODIMENTS

This invention will now be described in detail in conjunction with preferred embodiments and with reference to the accompanying drawings.

The terminal voltage of a starting condenser of a single phase induction motor becomes higher as the motor acquires speed and the current flowing through it becomes greater accordingly. This current in useful only for producing starting torque, but it is unnecessary during stationary operation time of the motor. That is, in order to increase the rotating torque while reducing the consumed power, the current must be greatly reduced in the stationary operation time of the motor. This can be achieved by the use of a condenser of which the effective capacitance becomes very small when the motor reaches the stationary operation state. From this point of view, the character of a condenser for alternating current control using a ferro-electric material will be examined hereunder.

When an AC voltage V is applied to a ferro-electric member with spontaneous polarization Ps, area S and thickness d, and the voltage is raised higher than the product of the coersive electric field Ec of the member and the thickness d thereof, a hysteresis characteristic appears in the relation between the charge Q accumulated therein and the voltage v and the admittance of the member virtually becomes considerably high because of the inversion of the spontaneous polarization. The relation as mentioned above can be expressed by d ≦ V/Ec At this time the current i following through it is given by the following formula;

$$i = dQ/dt = 2P_s S\, dZ/dt, \qquad 1$$

where Z is related to the sense of the polarization and is in the range $-1 \le Z \le 1$. If $f = dZ/dt$, then $i = 2P_s Sf$. From this relation, we can see that the current i is not dependent on the voltage V and is proportional only to PsS.

Figure 1:
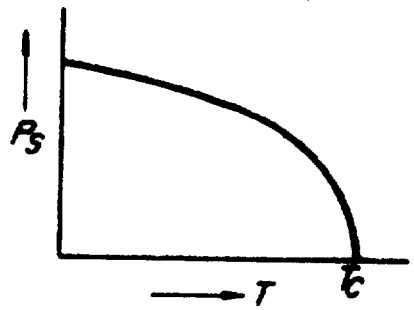
FIG. 1 is a graph showing the relation between spontaneous polarization of a ferro-electric material and temperature.

It will be noted that the area S of the dielectric member is constant but that Ps depends largely on temperature T as shown in FIG. 1, it being zero at a temperature higher than the Curie-point Tc. Within the ferro-electric member, an energy of 2PsSv is lost as heat (hysteresis loss) during each cycle of the AC voltage because of the spontaneous polarization inversion as described above, with the result that its temperature is raised to a temperature where the quantity of produced heat produced balances with that of the heat radiated.

As can be seen from the facts described above, when a condenser for AC current control using a ferro-electric material is used as a starting condenser, if the temperature of the ferro-electric material can be raised near the Curie-point by the self-heating due to said hysteresis loss by the time the motor reaches the stationary operation state, after the start, the expected object can be achieved.

However, if the Curie temperature of the ferro-electric material to be used is too high, it is difficult to raise the temperature by the self-heating near the Curie-point. It is also undesirable that the difference between Ps at the lowest temperature and that at the highest temperature is too large, since in such case the temperature dependence of the starting characteristic becomes too great. Therefore, it is necessary to use a ferro-electric material having the Curie temperature of about 50° c – 130° C.

Now, TGS (tri-glycine sulphate) will be considered as one of such ferro-electric materials.

In TGS, the spontaneous polarization Ps and coersive electric field Ec are 3[μ Coul/Cm$^2$] and 300[Volt/Cm], respectively, and if it is assumed that the density of TGS is 1.69, Tc is 50° C, the mean specific heat of it over a range from 20° C to 50° C is 0.39[Cal/g.deg], V = 100 [V], f = 5050 Hg], d = 0.33 [Cm] and S = 53 [Cm$^2$], then the quantity of heat Q required to raise its temperature from 20° C to the Curie temperature Tc is 350 [Cal], while the quantity of heat Q' due to the self heating is 3.75 [Cal].

In ceramics of the BaTiO$_3$ - SrTiO$_3$ system, Ps and Ec are 10 [μ Coul/Cm$^2$] and 3 [K Volt/Cm], respectively, and if it is assumed that d = 0.03 [Cm] and the other conditions are the same as that described above, Q and Q' becomes 36 [Joule] and 15 [Joule], respectively.

Thus, in such ferro-electric materials the difference between Q and Q' is large and thus it is clear that such materials are not of practical use. After all, a material of the Pb(Zr-Ti)O$_3$ system is the most suitable as the Tc thereof is near the room temperature, with a small mean specific heat and large PSEc.

Figure 2:
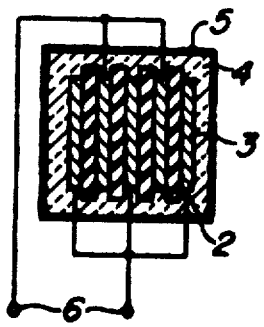
FIGS. 2 and 3 are schematic diagrams showing embodiments of this invention.
Figure 4:
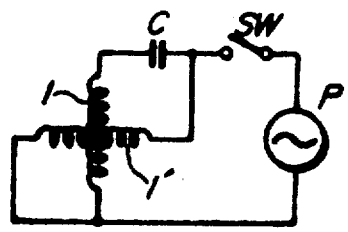
FIG. 4 is a circuit diagram showing a drive circuit for a single phase induction motor.

In FIG. 2, there is shown an example of the construction of a starting condenser C which is to be connected in series with a starting winding 1 of a single phase induction motor such as shown in FIG. 4. In FIG. 4, numeral 1' denotes a main winding, SW a power switch and P an AC power source. In the Figure, a rotor of the motor is not shown. In FIG. 2, numeral 2 denotes ceramics of the Pb(Zr-Ti)O$_3$ system, 3 electrodes, 4 a glass wool enclosure for heat insulation, 5 a heat emission case and 6 terminals. It was found from a test of the characteristic of this condenser that in the stationary rotation time under noload, the terminal voltage $V_c$ of the condenser was 270 V, the current $I_c$ 60 mA and the current $i_p$ at the power source P 270 mA.

On the other hand, with a conventional condenser of 2 μF connected in lieu of the above condenser, the voltage $V_c$ was 300 V, $I_c$ 220 mA and $i_p$ 350 mA. It will be seen that a considerable improvement was achieved with the former condenser.

Figure 3:
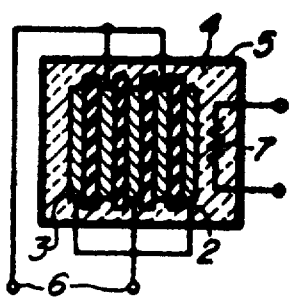

When the heat insulation of the condenser shown in FIG. 2 is too complete, it takes a long time for heat emission. On the contrary, if the heat insulation is poor, it is difficult to raise the temperature only by the self-heating effect. This point must be considered in order to obtain a quick response of the motor when the power switch SW is opened or closed. One means of settling the problem is to use an auxiliary heater 7 as shown in FIG. 3. The capacity of the auxiliary heater should be within ten times of the power (hysteresis loss) consumed by the condenser in operation time or less than 10 percent of the driving power of the motor. Of course, heat produced from the element per se may be utilized to heat said ferro-electric material if making the resistance of the element low by a suitable measure, for example, by a reduction process. The condenser according to this invention can be used not only for a single phase induction motor but also for similar apparatuses. In such cases, the condenser is not required to be necessarily made in such a structure as shown in FIG. 2 or 3, but the structure known in the art may be good enough depending on the application.

The merits of this invention will be clear from the above description, especially in that the operation characteristic of a single phase induction motor may be improved according to this invention, without using any switching means.

We claim:

1. A condenser for alternating current control comprising a plurality of electrodes, a pair of terminals each connected with every other ones of said electrodes, ceramics of a material of a Pb(Zr-Ti)O$_3$ system between said electrodes, heat insulation means surrounding said electrodes and ceramics, and a heat emission case which further surrounds the heat insulation means.

2. A condenser according to claim 1, wherein a heater is provided within the heat emission case.

3. A switching condenser element for switching an alternating current comprising a least a pair of input terminals to which an alternating current is applied, electrodes connected to said terminals and a ferroelectric member substantially consisting of a solid solution of PbZrO$_3$ and PbTiO$_3$ which is provided between the electrodes and whose thickness d is determined in accordance with the relation $d \leq V/E_c$ where V is a voltage applied to said member and $E_c$ is the coercive electric field of said member, whereby said member is heated by application of the alternating current to a temperature near its Curie-point and the alternating current becomes about zero at this temperature.

4. The switching condenser element according to claim 3, wherein at least a portion of Pb in the ferroelectric member is substituted by one of divalent metallic elements.

5. The switching condenser element according to claim 3, wherein at least a portion of Pb in the ferroelectric member is substituted by one of rare earth elements.

6. The switching condenser element according to claim 3, wherein at least a portion of Zr in the ferroelectric member is substituted by an element selected from the group consisting of Sn, Nb, Ta, P, As, Sb, Bi, Cr, W, Fe, Co, and Ni.

7. The switching condenser element according to claim 3, wherein at least a portion of Ti in the ferroelectric member is substituted by an element selected from the group consisting of Sn, Nb, Ta, P, As, Sb, Bi, Cr, W, Fe, Co, and Ni.

8. The switching condenser element for switching an alternating current according to claim 3, which further comprises heat insulation means surrounding said electrodes and said member, and a heat emission case which further surrounds the heat insulation means.

9. The switching condenser element according to claim 8, wherein a heater is provided within the heat emission case.

* * * * *